United States Patent
Nakamura

(10) Patent No.: US 6,622,191 B1
(45) Date of Patent: Sep. 16, 2003

(54) COMPUTER SYSTEM

(75) Inventor: Nobutaka Nakamura, Hidaka (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 470 days.

(21) Appl. No.: 09/702,990

(22) Filed: Nov. 1, 2000

(30) Foreign Application Priority Data

Nov. 24, 1999 (JP) .......................................... 11-333377

(51) Int. Cl.[7] .......................... G06F 13/00; G06F 13/38; G06F 9/48
(52) U.S. Cl. ........................ 710/260; 710/300; 710/306
(58) Field of Search ............................... 710/260, 300, 710/306, 313, 240, 107, 309, 48; 709/200; 370/451

(56) References Cited

U.S. PATENT DOCUMENTS

| | | | |
|---|---|---|---|
| 4,218,740 A | * | 8/1980 | Bennett et al. |
| 4,748,560 A | * | 5/1988 | Kataoka |
| 5,457,785 A | | 10/1995 | Kikinis et al. .............. 395/308 |
| 5,579,489 A | | 11/1996 | Dornier et al. ............. 395/281 |
| 5,619,659 A | | 4/1997 | Kikinis et al. .............. 395/281 |
| 5,781,747 A | | 7/1998 | Smith et al. |
| 5,822,571 A | | 10/1998 | Goodrum et al. ........... 395/551 |
| 5,848,278 A | | 12/1998 | Sakai ......................... 395/733 |
| 5,944,809 A | * | 8/1999 | Olarig et al. |
| 6,070,214 A | | 5/2000 | Ahern |
| 6,088,752 A | | 7/2000 | Ahern |

FOREIGN PATENT DOCUMENTS

EP  0 811 929  12/1997

* cited by examiner

Primary Examiner—Gopal C. Ray
(74) Attorney, Agent, or Firm—Finnegan, Henderson, Farabow, Garrett & Dunner, L.L.P.

(57) ABSTRACT

A PCI-PCI bridge which connects a primary PCI (Peripheral Component Interconnect) bus and a secondary PCI bus comprises two physically different controllers, a primary PCI serial transfer controller located on a PC (Personal Computer) body side and a secondary PCI serial transfer controller located on a docking station side. Both controllers are connected together by serial LVDS (Low Voltage Differential Signal) lines, and data needed to transfer a bus cycle is serially transferred between both controllers. An interrupt signal generated on the docking station side is serially transferred to the primary PCI serial transfer controller from the secondary PCI serial transfer controller via the serial LVDS lines for transferring data in a bus cycle.

16 Claims, 10 Drawing Sheets

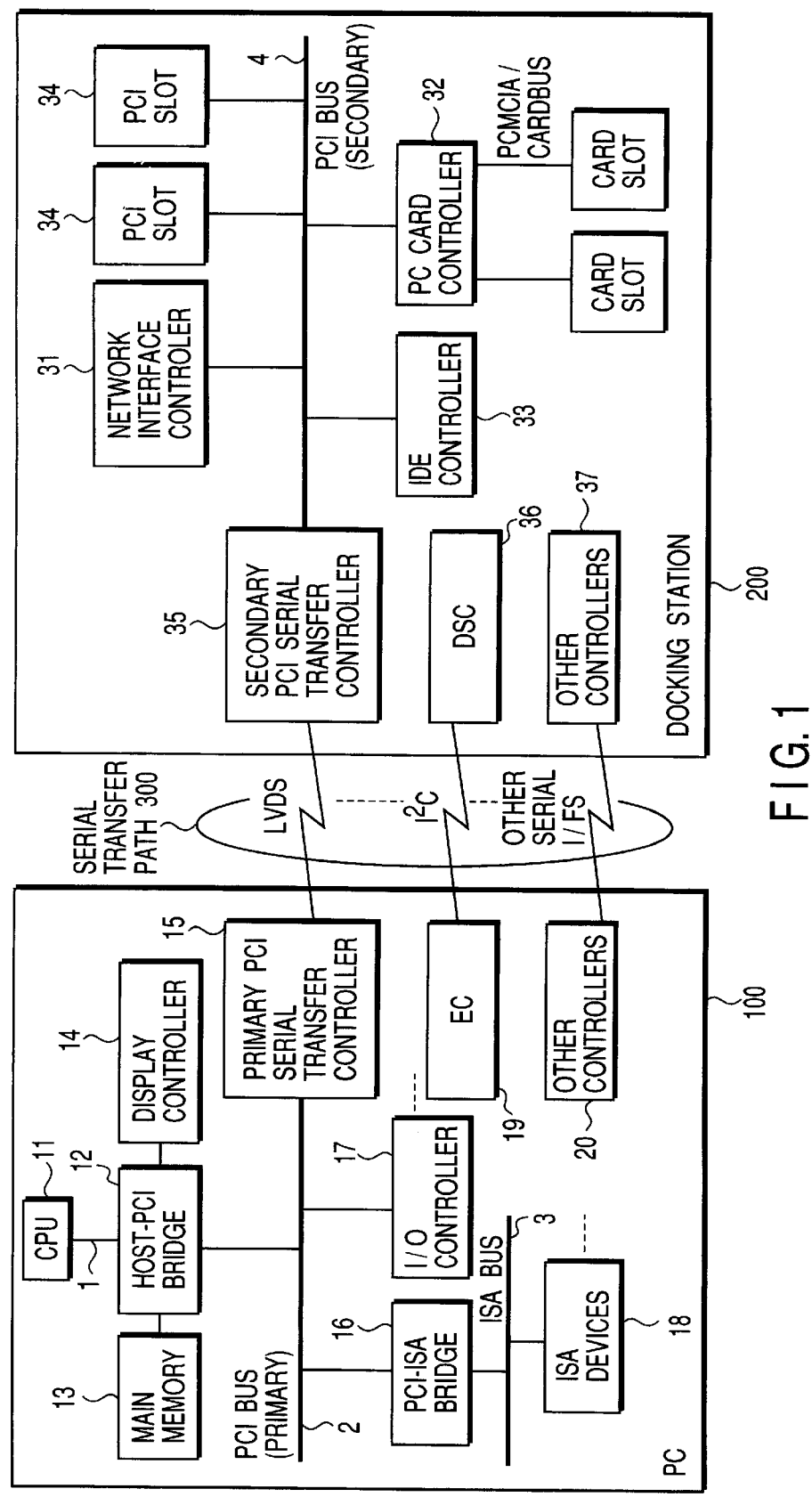
F I G. 1

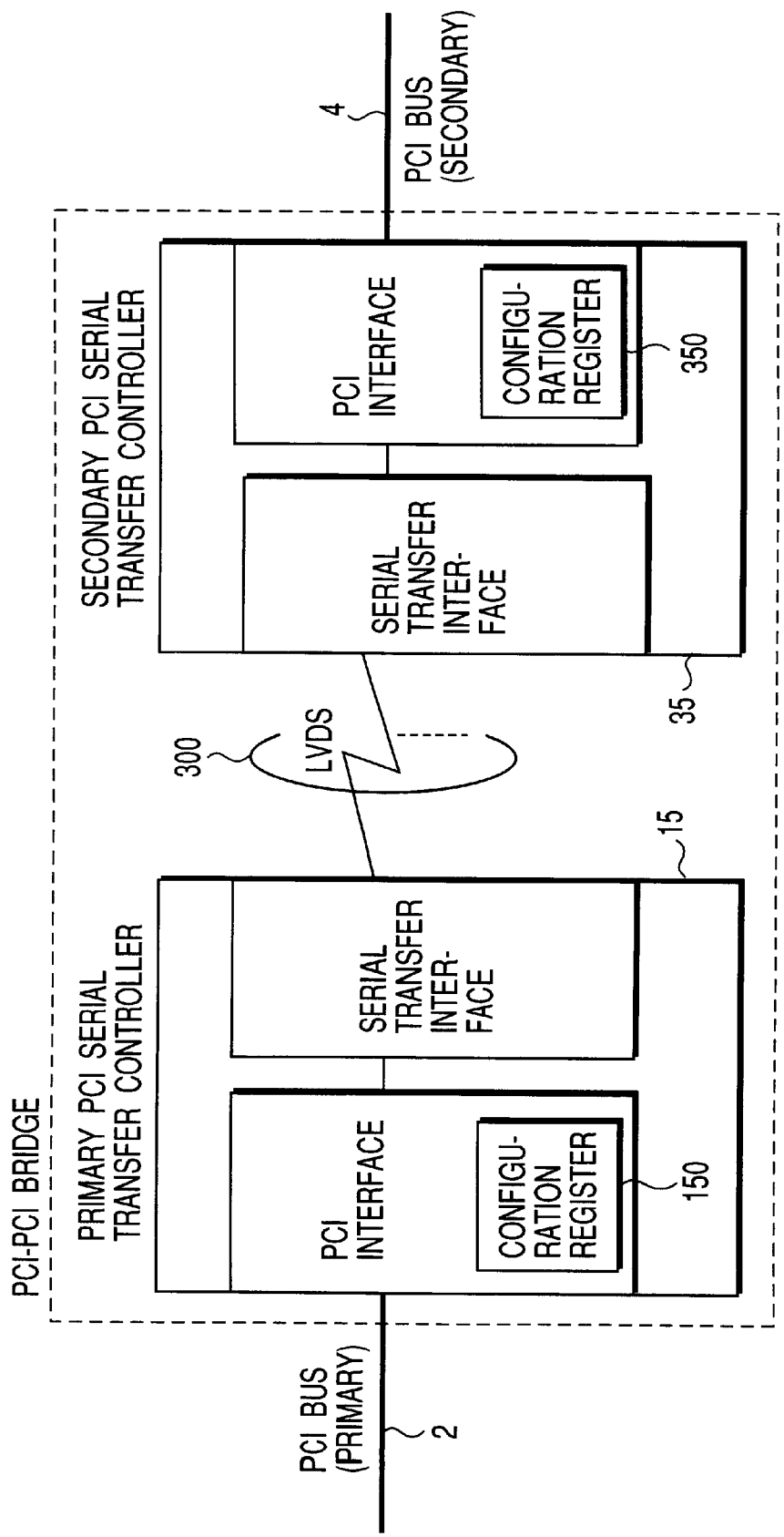
F I G. 2

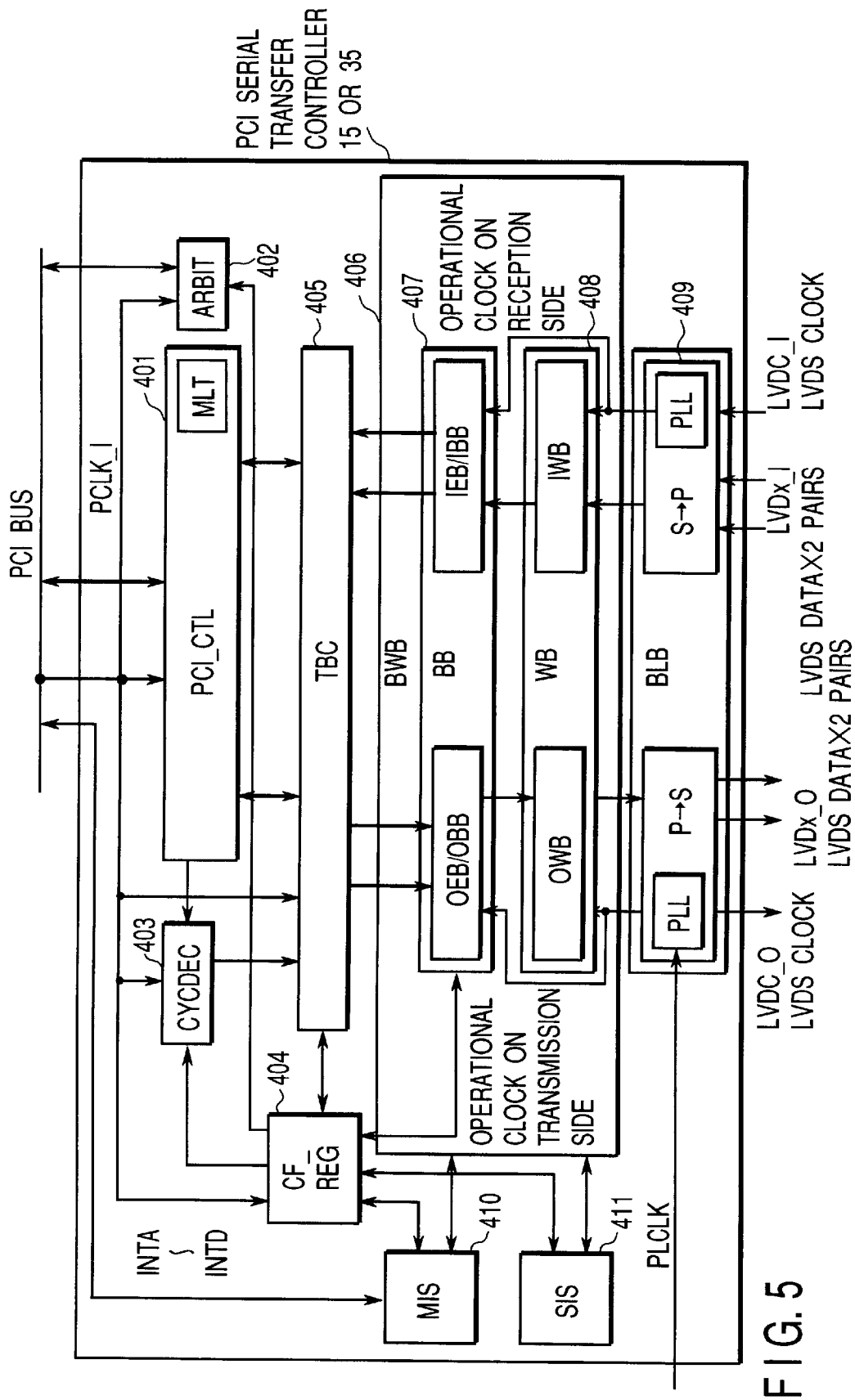
F I G. 5

| b16 | b15 ... b8 | b7 ... b4 | b3 | b2 | b1 b0 |
|---|---|---|---|---|---|
| C/D | CONTROL WORD ID (INTERRUPTION) | VACANT | DIRECTION | VACANT | BIT NUMBER |
F I G. 11
PRIMARY PCI SERIAL TRANSFER CONTROLLER
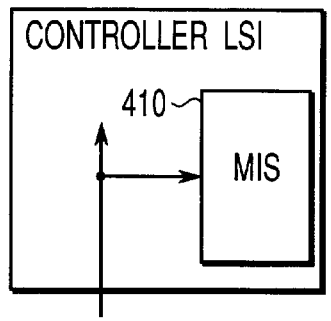
PRIMARY / SECONDARY SWITCHING SIGNAL ="1"
F I G. 12A
SECONDARY PCI SERIAL TRANSFER CONTROLLER
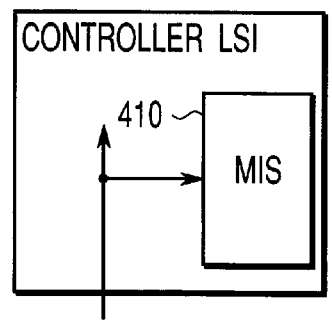
PRIMARY / SECONDARY SWITCHING SIGNAL ="0"
F I G. 12B
PRIMARY PCI SERIAL TRANSFER CONTROLLER
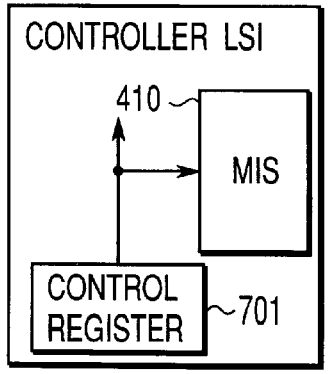
F I G. 13A
SECONDARY PCI SERIAL TRANSFER CONTROLLER
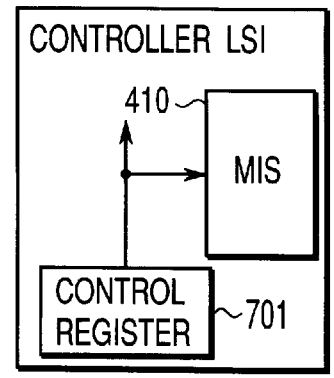
F I G. 13B

COMPUTER SYSTEM

CROSS-REFERENCE TO RELATED APPLICATIONS

This application is based upon and claims the benefit of priority from the prior Japanese Patent Application No. 11-333377, filed Nov. 24, 1999, the entire contents of which are incorporated herein by reference.

BACKGROUND OF THE INVENTION

The present invention relates to a computer system, and, more particularly, to an improved computer system which connects two buses by a serial transfer line.

Recently have been developed various notebook type personal computers (hereinafter called "notebook PCs") which are easy to carry around and operatable on a battery. Some notebook PCs are so designed as to be able to attach to an expansion unit, as needed, in order to expand the functions. To effectively use resources of the expansion unit from a notebook PC body, it is important to connect a bus in the notebook PC body to a bus in the expansion unit. This bus interconnection can allow devices on the bus in the expansion unit to be treated like devices in the notebook PC body.

Many personal computers employ a PCI (Peripheral Component Interconnect) bus. Therefore, bus interconnection between a notebook PC body and an expansion unit is normally accomplished by providing the notebook PC body and the expansion unit with docking connectors each having multiple pins equivalent in number to signal lines of a PCI bus and physically connecting the PCI buses of both the notebook PC body and expansion unit via the docking connectors.

Because this structure needs a large mount area for the docking connector, it is disadvantageous in making notebook PC bodies more compact and flatter. Further, the mount position for the docking connector on a notebook PC body should aligned with the mount position for the docking connector on an expansion unit. This puts some restriction on the physical casing structures of new products which are being developed.

U.S. Pat. Nos. 5,457,785, 5,579,489 and 5,619,659 disclose a scheme of connecting a PC body to an expansion unit by using the standard parallel port of the PC body. According to this scheme, an ISA bus is formed in an expansion unit, which is connected to a PC body by a cable, via the standard parallel port of the PC body and the ISA bus in the expansion unit is allowed to perform the same operation as the ISA bus in the PC using a circuit which interprets the signal status of the ISA bus in the PC body.

Another U.S. Pat. No. 5,822,571 discloses the structure wherein a primary PCI bus is connected to a secondary PCI bus by a flat cable and a PCI bus extends from a PC body to another casing, and a method for clock synchronization which copes with transfer delay in the cable.

As those conventional cable-based interconnecting methods carries out parallel data transfer over a cable, however, the cable contains many signal lines. In particular, exclusive signal lines for transferring interrupt signals are provided in addition to signal lines for an address, command, data and so forth, thus making the total number of signal lines extremely large. This leads to the following shortcomings.

1) The cable becomes thicker and harder to handle and the cost gets higher.

2) The number of pins of a connector for cable connection increases, which results in a higher cost and stands in the way of making a notebook PC compact.

BRIEF SUMMARY OF THE INVENTION

Accordingly, it is an object of the present invention to provide a computer system which can transfer data needed to transfer a bus cycle between buses and an interrupt signal in the same transfer line, thus permitting a host system to be connected to an expansion unit by a cable having fewer signal lines.

To achieve the above object, according to one aspect of this invention, there is provided a computer system comprising a first bus for transferring a first interrupt signal; a second bus for transferring a second interrupt signal; a first controller connected to the first bus; a second controller, connected to the second bus, executing a transfer cycle including a bus cycle with the first controller means for coupling the first controller with the second controller; means, connected to the first controller, for generating control data indicating a state of the first interrupt signal on the first bus; and means, connected to the second controller, for outputting a second interrupt signal on the second bus based on the control data.

It is preferable that the transfer cycle is a serial transfer cycle.

In this computer system, the data transfer means for interconnecting two (first and second) buses is separated into two physically different controllers to execute the transfer cycle, desirable serial transfer cycle. This transfer cycle accomplishes exchange of data needed to transfer a bus cycle, such as a command, address and data, between the two controllers. With regard to an interrupt signal, control data indicating the state of the interrupt signal is inserted in the transfer cycle for transferring data of a bus cycle and then transferred. This can permit transfer of both data needed to transfer a bus cycle and an interrupt signal via the same transfer line or the like. Therefore, providing each of a host system and an expansion unit with two controllers which constitute a bus bridge, for example, can permit the host system to be connected to the expansion unit by a cable with fewer signal lines.

The host system is not limited to a computer body itself. For example, a computer body may be connected to a first expansion unit through which a second expansion unit is connected to the computer body. In this case, as seen from the second expansion unit, the computer body and the first expansion unit serve as a host system.

The means for generating the control data is characterized by detecting a change in the first interrupt signal on the first bus, and generates control data indicating the state of the first interrupt signal and inserts the control data into the serial transfer cycle when detecting the change in the first interrupt signal. As control data indicating the state of an interrupt signal is serially transferred only when the state of this interrupt signal has been changed, the throughput of serial transfer for transferring a bus cycle will not be affected.

In the case of using this structure that executes serial transfer of control data when the state of an interrupt signal has been changed, it is preferable that the means for generating the control data should have a latch circuit for holding a state of the second interrupt signal until receiving new control data indicating a state of a next first interrupt signal. With regard even to a level triggered interrupt signal, like a PCI bus interrupt signal, whose level should be held until the interrupt signal is received by software, therefore, the system can accurately be informed of the occurrence of interruption merely by serially transferring control data only when the state of the interrupt signal has been changed.

Further, in the case where control data is serially transferred when the state of an interrupt signal has been changed, the event of occurrence of an interrupt signal is immediately notified to the software. It is therefore preferable to provide for arbitrating all data transferred via the serial transfer line in such a way that the control data is serially transferred with a highest priority over other data when there are plural kinds of data to be serially transferred in the serial transfer cycle.

Even in the case where data is transferred in parallel between the controllers, transferring the state of an interrupt signal via the data transfer line can eliminate the need for a special transfer line for the interrupt signal. This can contribute to reducing the number of signal lines. In other words, the fundamental concept of this invention is the transfer of the state of an interrupt signal itself as one of bus transactions in order to reduce the number of signal lines. While it is most effective to adapt this structure to a bus bridge, this invention may also be adapted to transfer of an interrupt signal from a first interruption controller connected to one of two buses to a second interruption controller connected to the other bus.

To achieve the above object, according to another aspect of this invention, there is provided a data transfer method comprising: the step of detecting a first interrupt signal on a first bus; generating control data indicating a state of the first interrupt signal in response to the detection of the first interrupt signal; transferring the control data to a second bus by interrupting the control data into serial transfer cycle which includes a bus cycle between the first bus and the second bus; and outputting a second interrupt signal on the second bus based on the control data in such a way that the first interrupt signal is reflected on the second bus.

In this data transfer method, the control data in response to detection of the first interrupt signal is generated and transferred to the second bus by interruption into serial transfer cycle, which includes a bus cycle between the first bus and the second bus. The second interrupt signal is outputted on the second bus based on the control data in such a way that the first interrupt signal is reflected on the second bus. Consequently, the transfer cycle executed between the first bus and the second bus accomplishes exchange of data needed to transfer a bus cycle, such as a command, address and data, between the two controllers. In addition, with regard to an interrupt signal, control data indicating the state of the interrupt signal is inserted in the transfer cycle for transferring data of a bus cycle and then transferred. This can permit transfer of both data needed to transfer a bus cycle and an interrupt signal via the same transfer line or the like. Therefore, providing each of a host system and an expansion unit with two controllers which constitute a bus bridge, for example, can permit the host system to be connected to the expansion unit by a cable with fewer signal lines.

The host system is not limited to a computer body itself. For example, a computer body may be connected to a first expansion unit through which a second expansion unit is connected to the computer body. In this case, as seen from the second expansion unit, the computer body and the first expansion unit serve as a host system.

The first bus transfers a first plurality of interrupt signals; the second bus transfers a second plurality of interrupt signals; and the step of generating control data includes the steps of: detecting a change in the first interrupt signal on the first bus; and generating the control data including a bit pattern corresponding to the first plurality of interrupt signals on the first bus when the change in the first interrupt signal on the first bus has been detected. As control data indicating the state of an interrupt signal is serially transferred only the state of this interrupt signal has been changed, the throughput of serial transfer for transferring a bus cycle will not be affected.

In the case of using this structure that executes serial transfer of control data when the state of an interrupt signal has been changed, it is preferable that the second interrupt signal should be held by a latch circuit until receiving new control data indicating a state of a next first interrupt signal. With regard even to a level triggered interrupt signal, like a PCI bus interrupt signal, whose level should be held until the interrupt signal is received by software, therefore, the system can accurately be informed of the occurrence of interruption merely by serially transferring control data only when the state of the interrupt signal has been changed.

Further, in the case where control data is serially transferred when the state of an interrupt signal has been changed, the event of occurrence of an interrupt signal is immediately notified to the software. It is therefore preferable to provide for the step of arbitrating all data transferred via the serial transfer cycle in such a way that the control data is serially transferred with a highest priority over other data when there are plural kinds of data to be serially transferred in the serial transfer cycle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram illustrating the structure of a computer system according to a first embodiment of this invention;

FIG. 2 is a block diagram showing the structure of a PCI-PCI bridge which is used in this embodiment;

FIG. 5 is a block diagram depicting the specific hardware structures of the primary PCI serial transfer controller and the secondary PCI serial transfer controller used in this embodiment;

FIG. 11 is a diagram showing another example of the data format of interruption notifying control data which is used in this embodiment;

Figure 3:
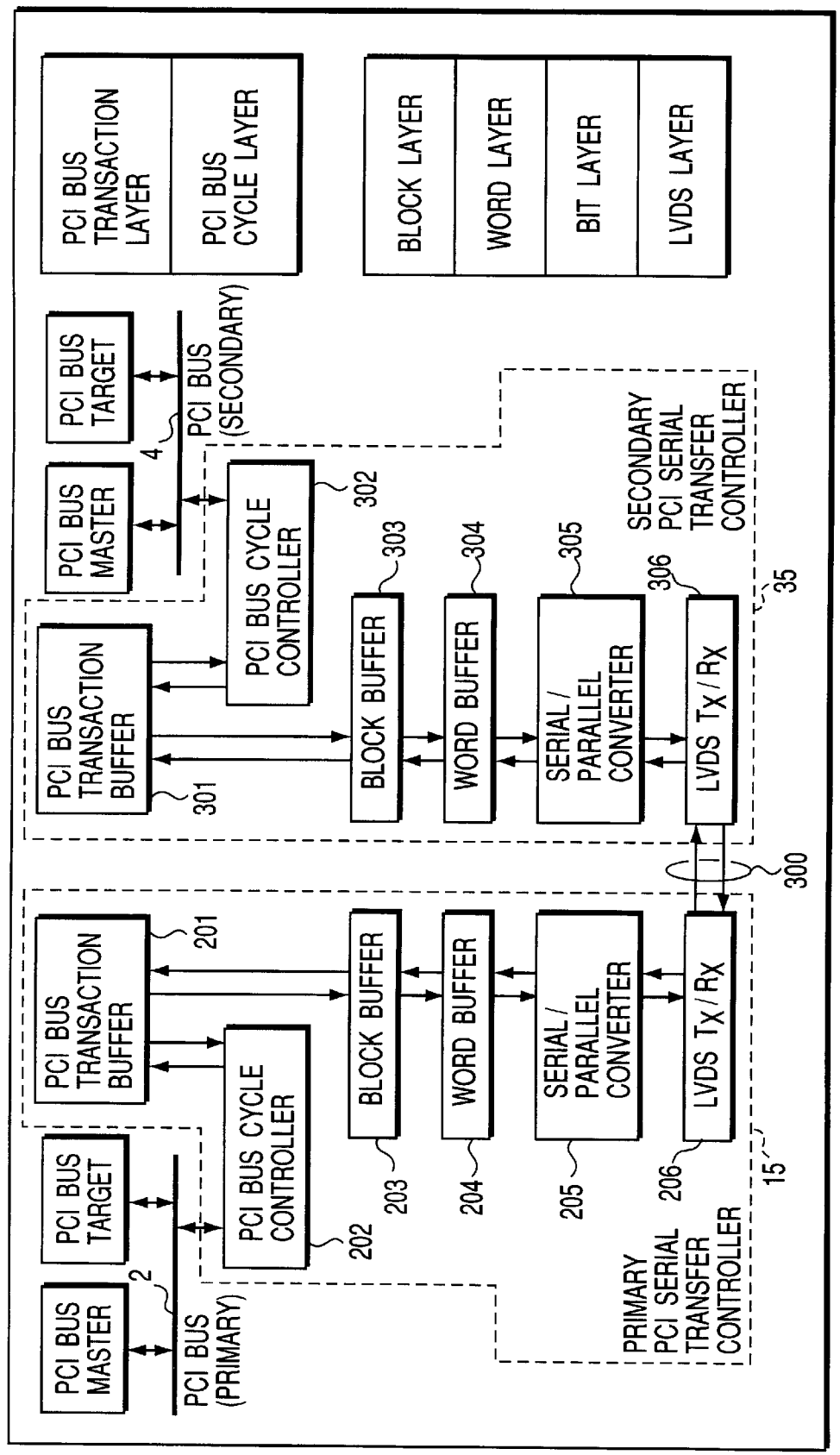
FIG. 3 is a block diagram showing the internal structures of a primary PCI serial transfer controller and a secondary PCI serial transfer controller which are used in this embodiment.

FIGS. 12A and 12B are diagrams exemplifying a control mode for allowing two controllers used in this embodiment to serve as the primary PCI serial transfer controller and the secondary PCI serial transfer controller; and FIGS. 13A and 13B are diagrams showing another example of the control mode for allowing two controllers used in this embodiment to serve as the primary PCI serial transfer controller and the secondary PCI serial transfer controller.

DETAILED DESCRIPTION OF THE INVENTION

An embodiment of the present invention will be described below with reference to the views of the accompanying drawing.

FIG. 1 shows the arrangement of a computer system according to an embodiment of the present invention. This computer system is a notebook type personal computer (PC) and comprises a PC body 100 and a docking station 200 for function expansion, which can be used after it is connected to the PC body 100 through a cable. The signal lines in the cable constitute a serial transfer path 300, as shown in FIG. 1. The serial transfer path 300 is constituted by an LVDS (Low Voltage Differential Signaling) line, I²C (Inter Integrated Circuit) bus, and other serial control signal lines.

The LVDS line is a serial transmission path that is used to serially connect a PCI bus 2 in the PC body 100 to a PCI bus 4 in the docking station 200. Bus transactions are exchanged between the PCI bus 2 in the PC body 100 and the PCI bus 4 in the docking station 200 by high-speed bit serial signal transfer through this serial transmission path.

As shown in FIG. 1, the PC body 100 comprises a processor bus 1, PCI bus 2, ISA bus 3, CPU 11, host-PCI bridge 12, main memory 13, display controller 14, primary PCI serial transfer controller 15, PCI-ISA bridge 16, I/O controllers 17, various ISA devices 18, EC (Embedded Controller) 19, various other controllers 20, and the like.

The CPU 11 controls the overall of this PC system and executes the operating system, system BIOS, and various other programs loaded into the main memory 13. The host-PCI bridge 12 is a bridge unit for bidirectionally connecting the processor bus 1 to the primary PCI bus 2. The host-PCI bridge 12 incorporates a memory control logic for access control on the main memory 13 and a control logic for an AGP (Accelerated Graphics Port) that is used for connection to the display controller 14. The host-PCI bridge 12 can function as a bus master on the primary PCI bus 2. The main memory 13 stores, for example, the operating system, application programs/utility programs to be processed, and user data generated by application programs and the like.

The primary PCI serial transfer controller 15 logically forms one PCI-PCI bridge unit in cooperation with a secondary PCI serial transfer controller 35 implemented in the docking station 200. This PCI-PCI bridge unit serves to bidirectionally connect the PCI bus 2 in the PC body 100 to the PCI bus 4 in the docking station 200. The PCI-PCI bridge unit allows a device on the PCI bus 2 to access a device on the PCI bus 4, and vice versa. The PCI bus 2, which is closer to the host (CPU) side from the viewpoint of the PCI-PCI bridge unit, serves as the primary PCI bus of the PCI-PCI bridge unit, whereas the PCI bus 4, which is farther from the host side, serves as the secondary PCI bus of the PCI-PCI bridge unit. In this embodiment, therefore, the PCI-PCI bridge unit that connects the primary PCI bus 2 to the secondary PCI bus 4 is divided into two physically isolated controllers (the primary PCI serial transfer controller 15 and secondary PCI serial transfer controller 35), and two controllers are connected to each other through LVDS lines, thereby realizing a PCI serial interface. The serial transfer through the LVDS lines is used not only to transmit PCI bus cycle but also to transmit interrupt signal. As present, the serial transfer cycle of both data needed to transfer a bus cycle the interrupt signal via the LVDS lines can allow signal lines necessary to the PCI serial interface to reduce largely.

The PCI-ISA bridge 16 is a bridge for connecting the PCI bus 2 to the ISA bus 3. Various ISA devices 18 are connected to the ISA bus 3. The I/O controllers 17 are devices functioning as bus masters or targets on the PCI bus 2. Devices such as a PC card controller, IDE (Integrated Drive Electronics) controller, and sound controller are connected as the I/O controllers 17 to the PCI bus 2.

The EC (Embedded Controller) 19 controls the power management of the PC body 100 and also controls a docking/undocking sequence for the docking station 200 by communicating with a DSC (Docking Station Controller) 36 implemented in the docking station 200.

As shown in FIG. 1, the docking station 200 incorporates the PCI bus 4, a network interface controller 31, a PC card controller 32, an IDE controller 33, PCI slots 34, the secondary PCI serial transfer controller 35, the DSC (Docking Station Controller) 36, other controllers 37, and the like.

The network interface controller 31 performs communication control for connection to a LAN, and serves as a bus master or target on the PCI bus 4. The PC card controller 32 controls a PC card complying with the PCMCIA (Personal Computer Memory Card International Association)/CardBus specifications and inserted into a PC card slot. The PC card controller 32 also serves as a bus master or target on the PCI bus 4. The IDE controller 33 controls IDE devices such as a hard disk drive and CD-ROM drive installed in the docking station 200, and serves as a bus master or target on the PCI bus 4. Various PCI expansion cards can be inserted into the PCI slots 34.

When the PC body 100 is connected to the docking station 200, these PCI devices such as the network interface controller 31, PC card controller 32, IDE controller 33, and PCI expansion cards of PCI slots 34 can be used as hardware resources in the PC body 100.

PCI-PCI Bridge

FIG. 2 shows the functional arrangements of the primary PCI serial transfer controller 15 and secondary PCI serial transfer controller 35.

As described above, although the primary PCI serial transfer controller 15 and secondary PCI serial transfer controller 35 are physically independent LSIS, they function as one PCI-PCI bridge logically. For this reason, the LVDS line connecting the primary PCI serial transfer controller 15 to the secondary PCI serial transfer controller 35 is just a local internal wiring inside the PCI-PCI bridge and is not recognized by software. This means that no unnecessary resource is assigned to the serial transmission path. Since the primary PCI serial transfer controller 15 and secondary PCI serial transfer controller 35 share the configuration address space assigned by one IDSEL signal, they are recognized as one device by software. Since two controllers, i.e., the primary PCI serial transfer controller 15 and secondary PCI serial transfer controller 35, are recognized as one device, only the primary PCI serial transfer controller 15 may have device identification information.

Each of the primary PCI serial transfer controller 15 and secondary PCI serial transfer controller 35 is constituted by a PCI interface section and serial transfer interface section.

In the primary PCI serial transfer controller 15, the PCI interface section exchanges bus transactions with the primary PCI bus 2. In the secondary PCI serial transfer controller 35, the PCI interface section exchanges bus transactions with the secondary PCI bus 4. The PCI interface sections exchange transactions with each other by serial data transfer between serial transfer interface sections respectively implemented in the primary PCI serial transfer controller 15 and the secondary PCI serial transfer controller 35.

A PCI bus is a parallel transmission path including address/data lines having a width of a plurality of bits, and the like. A bus transaction on the PCI bus is basically constituted by an address phase for outputting a command and address, and one or more data transfer phases following the address phase. If, therefore, the respective PCI interface sections exchange commands, addresses, and data between the corresponding PCI buses by serial transfer between the respective serial transfer interface sections, transactions can be transferred from the primary PCI bus 2 to the secondary PCI bus 4, and vice versa.

When a transaction from a bus master on the primary PCI bus 2 to a device on the secondary PCI bus 4 takes place, the primary PCI serial transfer controller 15 becomes a target for the transaction being executed on the primary PCI bus 2, and the secondary PCI serial transfer controller 35 becomes an initiator (bus master) for the transaction to be executed on the secondary PCI bus 4. When a transaction from a bus master on the secondary PCI bus 4 to a device on the primary PCI bus 2 takes place, the secondary PCI serial transfer controller 35 becomes a target for the transaction being executed on the secondary PCI bus 4, and the primary PCI serial transfer controller 15 becomes an initiator for the transaction to be executed on the primary PCI bus 2. Note that if no bus master device is present on the secondary PCI bus 4, only the former case holds.

As shown in FIG. 2, configuration registers 150 and 350 are separately implemented in the PCI interface sections of the primary PCI serial transfer controller 15 and secondary PCI serial transfer controller 35. Each of the configuration registers 150 and 350 comprises a register group complying with the PCI specifications. In these registers, identical pieces of environmental setting information are set.

Environmental setting information includes the above-mentioned device identification information, device control information for designating hardware resources such as a memory address space and I/O address space which the device is to use, device status information indicating the current state of the device, and the like.

Device identification information is used to identify the type of device, and consists of information such as a device ID, vendor ID, revision ID, header type, and class code. The device identification information is read-only information. Identical pieces of device identification information are written in the configuration registers 150 and 350. Obviously, this read-only device identification information may be prepared in only the primary PCI serial transfer controller 15 closer to the CPU 11, but need not be prepared in the secondary PCI serial transfer controller 35. This is because, in a configuration cycle, the CPU 11 accesses only the primary PCI serial transfer controller 15 and recognizes the existence of a PCI-PCI bridge between the PCI bus 2 and the PCI bus 4 by reading the device identification information from the primary PCI serial transfer controller 15.

A configuration register serves to hold environmental setting information for defining an operation environment for a PCI device. One configuration register is always implemented in each PCI device. Since the primary PCI serial transfer controller 15 and secondary PCI serial transfer controller 35 operate as one PCI device (PCI-PCI bridge), the controllers 15 and 35 can basically share one configuration register, as described above. If, however, a configuration register is implemented in only one controller in this manner, the other controller having no configuration register must read the configuration register in one controller through a serial transmission path for every transaction processing. This may cause degradation in system performance. Since configuration registers are separately implemented in two controllers 15 and 35 as in this embodiment, two controllers 15 and 35 can operate in accordance with the pieces of environmental setting information respectively set in their configuration registers. This makes it possible to realize high-speed operation. In this case, each of two controllers 15 and 35 includes most register groups (a register group for setting device control information, a register group for setting device status information indicating the current state of the device, and the like) except for a register for setting read-only device identification information.

The identity of the contents of the configuration registers 150 and 350 is realized by automatically executing the following copying operation between the primary PCI serial transfer controller 15 and the secondary PCI serial transfer controller 35. When the CPU 11 executes a write transaction (configuration write cycle) to write data in the configuration register 150, copying operation is automatically executed from the configuration register 150 to the configuration register 350. Thereafter, a status indicting the completion of a write is returned to the CPU 11. This makes it possible to always keep the contents of the configuration registers 150 and 350 identical.

Internal Arrangements of Two PCI Serial Transfer Controllers

The internal structures of the primary PCI serial transfer controller 15 and secondary PCI serial transfer controller 35 will be described with reference to FIG. 3, with consideration given to logical protocol hierarchical structures.

As shown in FIG. 3, the primary PCI serial transfer controller 15 comprises a bus transaction buffer 201, bus cycle controller 202, block transfer buffer 203, word buffer 204, serial/parallel converter 205, and LVDS transmission/reception section 206.

The bus transaction buffer 201 and bus cycle controller 202 correspond to the abovementioned PCI interface section. The block transfer buffer 203, word buffer 204, serial/parallel converter 205, and LVDS transmission/reception section 206 correspond to the abovementioned serial transfer interface section.

Likewise, as shown in FIG. 3, the secondary PCI serial transfer controller 35 comprises a bus transaction buffer 301, bus cycle controller 302, block transfer buffer 303, word buffer 304, serial/parallel converter 305, and LVDS transmission/reception section 306. The bus transaction buffer 301 and bus cycle controller 302 correspond to the abovementioned PCI interface section. The block transfer buffer 303, word buffer 304, serial/parallel converter 305, and LVDS transmission/reception section 306 correspond to the abovementioned serial transfer interface section.

The right end of FIG. 3 shows a protocol hierarchical structure for implementing a PCI serial interface in this embodiment. The top layer is a PCI bus transaction layer, and a PCI bus cycle layer follows, which is used to control a bus cycle required to actually execute a transaction.

The section implemented by integrating the sections above the bus cycle layer, including the left and right halves, i.e., the section implemented by integrating the bus transaction buffers 201 and 301 and bus cycle controllers 202 and 302, corresponds to a general PCI-PCI bridge.

The layers shown on the lower half of FIG. 3 correspond to a section for performing serial communication between the primary PCI serial transfer controller 15 and the secondary PCI serial transfer controller 35.

The layers shown on the upper half are designed in accordance with a PCI bus protocol, whereas the layers shown on the lower half are optimally designed to faithfully send data transferred on the PCI bus to the other party. There is no need to consider what meaning each data of a block to be transferred has on the PCI bus. It suffices if the block is properly assigned transfer characteristics suitable for the meaning which a set of data transferred over the block has on the PCI bus and if these transfer characteristics are implemented. That is, a concept similar to packet communication in the field of communication can be used.

In this regard, "WORD" in FIG. 3 corresponds to a fixed-length packet, and "BLOCK" is a transfer unit including one control word and 0 to 10 data words.

The meaning of each buffer will be described below.

The bus transaction buffers 201 and 301 are buffers for managing a PCI bus cycle as a transaction, and are used to mediate between a PCI bus cycle and block transfer as described later. The following are pieces of information constituting a transaction, although they slightly vary depending on the type of transaction:

address command write data (write transaction)

byte enables completion status read data (read transaction)

These pieces of information are held in the bus transaction buffers 201 and 301.

The block transfer buffers (BLOCK) 203 and 303 are temporary information storage devices for transferring variable-length data called blocks altogether between two serial controllers 15 and 35. The block size is variable, as described above. Each block is basically constituted by pieces of information such as an address, data, command, and byte enables, constituting one transaction.

The word buffers (WORD) 204 and 304 are temporary information storage devices for transferring fixed-length data called words one by one between two serial controllers 15 and 35. Words include control and data words. The substantial portion (PCI transaction information: address, command, data, byte enable, and the like) of each block is exchanged as data words, and the remaining portion is exchanged as control words.

The serial/parallel converters 205 and 305 perform parallel/serial conversion and serial/parallel conversion in units of words. The LVDS transmission/ reception section 206 and 306 perform actual serial data transfer through LVDS lines.

(Internal Structures of Two PCI Serial Transfer Controllers)

Referring now to FIG. 3, the internal structures of the primary PCI serial transfer controller 15 and the secondary PCI serial transfer controller 35 will be discussed with attention given to the logical protocol hierarchical structure.

As illustrated, the primary PCI serial transfer controller 15 comprises a transaction buffer 201, a bus cycle controller 202, a block buffer 203, a word buffer 204, a serial/parallel converter 205 and an LVDS transmission/reception section 206.

The transaction buffer 201 and bus cycle controller 202 are equivalent to the aforementioned PCI interface section, while the block buffer 203, word buffer 204, serial/parallel converter 205 and LVDS transmission/reception section 206 are equivalent to the aforementioned serial interface section.

Likewise, the secondary PCI serial transfer controller 35 comprises a transaction buffer 301, a bus cycle controller 302, a block buffer 303, a word buffer 304, a serial/parallel converter 305 and an LVDS transmission/reception section 306. The transaction buffer 301 and bus cycle controller 302 are equivalent to the aforementioned PCI interface section, while the block buffer 303, word buffer 304, serial/parallel converter 305 and LVDS transmission/reception section 306 are equivalent to the aforementioned serial interface section.

The right-hand end of FIG. 3 shows the protocol hierarchical structure to realize the PCI serial interface in this embodiment. The topmost layer is a PCI bus transaction layer below which lies a PCI bus cycle layer which controls a bus cycle needed to actually execute a transaction.

The integral section of the right half of the components that lie above the bus cycle layer and the left half thereof is equivalent to a normal PCI-PCI bridge. That is, the integral section of the transaction buffers 201 and 301 and the bus cycle controllers 202 and 302 is equivalent to the normal PCI-PCI bridge.

The lower half of layers in FIG. 3 is what performs serial communication between the primary PCI serial transfer controller 15 and the secondary PCI serial transfer controller 35.

While the upper half is designed in accordance with the protocol of the PCI bus, the lower half is optimally designed so as to send data to be transferred on the PCI bus to a destination faithfully. The significance of data to be transferred on the PCI bus need not be taken into consideration, but the transfer characteristic suitable for the significance of that data on the PCI bus should be assigned accurately and achieved. The idea employed here is similar to packet communication in the world of communications.

In that sense, "WORD" in the figure corresponds to a packet with a fixed length and "BLOCK" is a transfer unit including a control word consisting of one WORD and a data word consisting of 0 to 10 WORDS.

The transaction buffers 201 and 301 serve to manage a PCI bus cycle as a transaction and intervene between the PCI bus cycle and block transfer which is to be discussed later. The information that constitutes a transaction includes:

Address
Command
Write data (write transaction)
Byte enable
End status
Read data (read transaction)

Those pieces of information, which slightly vary depending on the type of a transaction, are stored in the transaction buffers 201 and 301.

The block buffers (BLOCK) 203 and 303 are temporary information storage areas where data of a variable length called a block is collectively transferred between the two serial controllers 15 and 35. A block, whose size is variable as mentioned previously, basically consists of information, such as an address, data, a command and byte enable, that constitutes one transaction.

The word buffers (WORD) 204 and 304 are temporary information storage areas where data of a fixed length called a word is transferred between the two serial controllers 15 and 35 one piece at a time. Words include a control word and a data word. The substantial portion of a block (PCI transaction information: address, command, data, byte enable, etc.) is exchanged as a data word and other various control information is exchanged as a control word.

The serial/parallel converters 205 and 305 perform parallel/serial conversion and serial/parallel conversion word by word. The LVDS transmission/reception sections 206 and 306 carry out actual serial data transfer via the LVDS lines.

(Buffer Structures)

Figure 4:
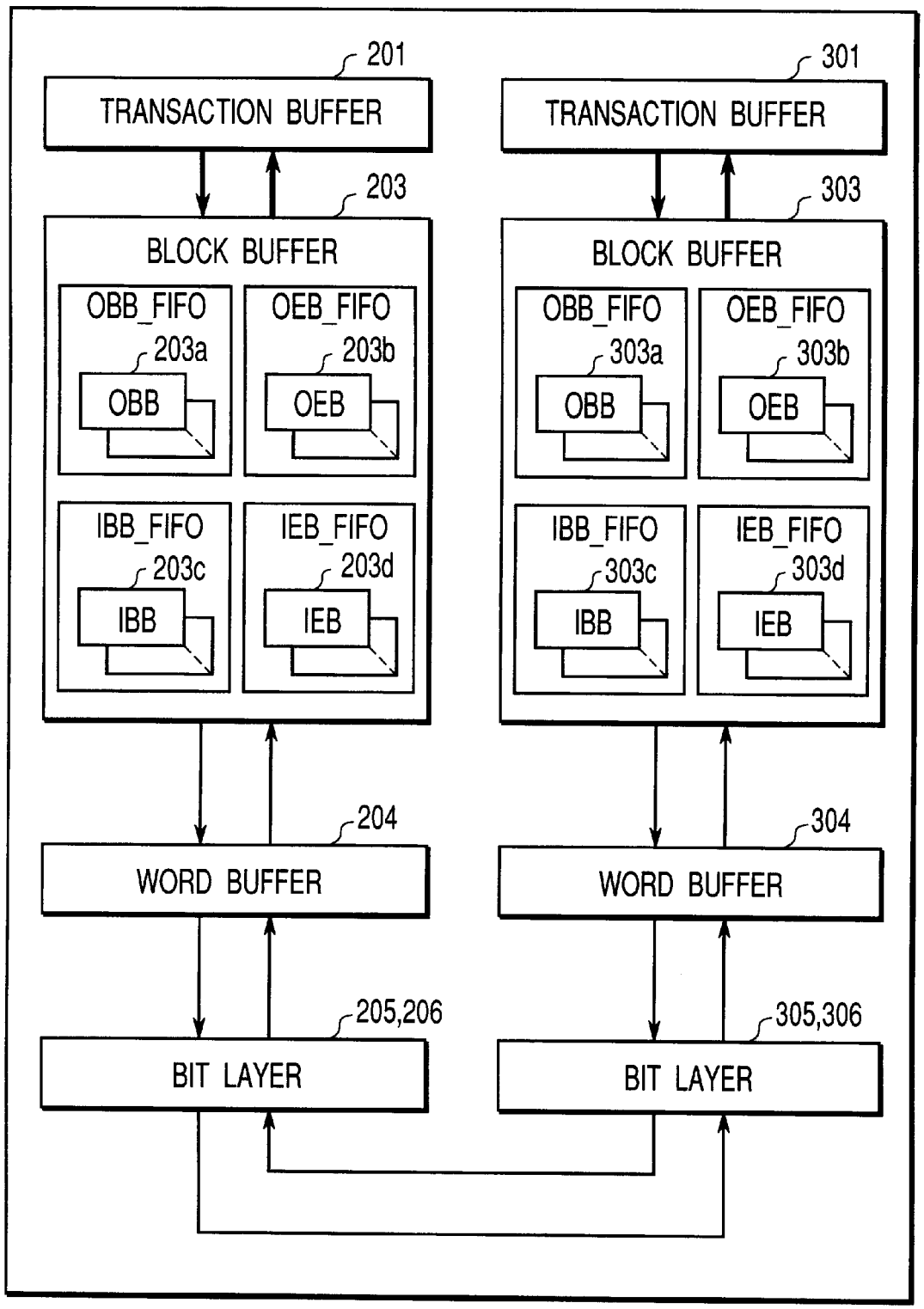
FIG. 4 is a block diagram depicting the buffer structures in the primary PCI serial transfer controller and the secondary PCI serial transfer controller used in this embodiment.

Referring now to FIG. 4, the specific buffer structures will be discussed.

There are the following two kinds of block buffers depending on the types of PCI transactions to be handled.
Express buffer (for a posted memory write transaction)
BLOCK buffer (for other transactions)

There are the following two kinds of block buffers depending on the flow of data.
Outgoing buffer (which stores information of a block to be transmitted)
Incoming buffer (which stores information of a received block)

Combining those buffers yields the following four kinds of buffers.
Outgoing Express buffer (OEB)
Outgoing BLOCK buffer (OBB)
Incoming Express buffer (IEB)
Incoming BLOCK buffer (IBB)

In this embodiment, each of OBB, OEB, IBB and IEB has four buffers in order to ensure the performance of the system. In this respect, four kinds of block buffer FIFOs, OBB_FIFO, OEB_FIFO, IBB_FIFO and IEB_FIFO, are provided.

As shown in FIG. 4, the block buffer 203 is provided with OBB_FIFO comprised of four Outgoing BLOCK buffers (OBB) 203*a*, OEB_FIFO comprised of four Outgoing Express buffers (OEB) 203*b*, IBB_FIFO comprised of four Incoming BLOCK buffers (IBB) 203*c* and IEB_FIFO comprised of four Incoming Express buffers (IEB) 203*d*. Likewise, the block buffer 303 is provided with OBB_FIFO comprised of four Outgoing BLOCK buffers (OBB) 303*a*, OEB_FIFO comprised of four Outgoing Express buffers (OEB) 303*b*, IBB_FIFO comprised of four Incoming BLOCK buffers (IBB) 303*c* and IEB_FIFO comprised of four Incoming Express buffers (IEB) 303*d*.

As mentioned above, a block is a collection of structured words. A block consists of the following three parts. Transmission and reception are chronologically carried out in the following order.
One control word
Plural data words (0 to 10 data words)
One checksum word A word is a collection of bits. Words are classified into a control word which carries control information and a data word which carries data. The block buffers 203 and 303 exchange data with lower processing layers word by word of 17 bits. The lower processing layers are the aforementioned word buffers and bit layer. The bit layer is equivalent to the serial/parallel converters 205 and 305 and the LVDS transmission/reception sections 206 and 306 in FIG. 3. The following process is executed by the lower processing layers and does not involve the block buffers 203 and 303.

Word buffer: adds a 1-bit parity to each 17-bit word that is handled by the block buffer, thus yielding 18-bit data.

Bit layer: converts 18-bit parallel data into serial data which is serially transferred at a high speed. Because each of the controllers 15 and 35 is provided with two LVDS lines for transmission and two LVDS lines for reception, 18-bit data is actually broken into two streams of 9 bits, each of which is converted into serial data, after which both serial data are serially transferred at the same time.

The above process is reversed on the reception side.

(Internal Structures of Two PCI Serial Transfer Controllers)

A description will now be given of the internal structures of the primary PCI serial transfer controller 15 and the secondary PCI serial transfer controller 35 with reference to FIG. 5.

The structure of the primary PCI serial transfer controller 15 is basically the same as the structure of the secondary PCI serial transfer controller 35. As illustrated, each controller comprises a PCI bus control block (PCI_CTL) 401, a PCI bus arbitration block (ARBIT) 402, a cycle decode block (CYCDEC) 403, a configuration register block (CF_REG) 404, a transaction buffer and control block (TBC) 405, a block and word buffer block (BWB) 406, a block buffer block (BB) 407, a word buffer block (WB) 408, a bit layer block (BLB) 409, a Misc information update block (MIS) 410 and a serial interrupt synchronization block (SIS) 411.

The PCI bus control block 401 controls the PCI bus mater and the PCI bus interface as a target, and has a master latency timer (MLT). The master latency timer measures the timing to stop a cycle with respect to the bus mater that is executing the current cycle. When a target operates, the PCI bus control block 401 is triggered by a hit signal from the cycle decode block 403. That is, when receiving the hit signal, the PCI bus control block 401 starts a target PCI bus cycle in response to the current PCI bus cycle on the PCI bus that is executed by the bus mater.

The PCI bus arbitration block 402 is an arbiter which executes arbitration of the PCI bus mater on the PCI bus.

In the PCI bus target operation, the cycle decode block 403 decodes the PCI cycle type and the address to make a hit decision. The cycle decode block 403 generates a cycle start signal for the transaction buffer and control block 405 and the hit signal for the PCI bus control block 401.

The configuration register block 404 is the aforementioned PCI configuration register.

The transaction buffer and control block 405 is a buffer which manages the PCI bus cycle as a transaction and controls data exchange between the block buffer block 407 and the PCI bus control block 401.

The block and word buffer block 406 has the two blocks, the block buffer block 407 which comprises the aforementioned block buffer and its control logic and the word buffer block 408 which comprises the aforementioned word buffer and its control logic, put together for the sake of convenience. The block buffer block 407 is used to temporarily store data which is exchanged with the transaction buffer and control block 405 or the word buffer block 408. The block buffer block 407 has independent buffers, one (OEB/IEB) for post writing and the other (OBB/IBB) for other transactions than post writing. In the figure, "OEB/OBB" is a transmission buffer and "IEB/IBB" is a reception buffer. The transmission and reception buffers respectively operate in response to asynchronous transmission and reception clocks that are generated by a PLL in the bit layer block 409. As no PCI clock is used, those buffers become asynchronous with the blocks located in higher layers than the block buffer block 407. The block and word buffer block 406 also controls the generation of a checksum, an error check on the serial bus and a resending process.

The word buffer block 408 is a temporary storage buffer for transferring data (BLOCK) of a fixed length from the block buffer block 407 to the bit layer block 409 word by word. In the figure, "OWB" is a transmission buffer and "IWB" is a reception buffer, and those buffers respectively operate in response to asynchronous transmission and reception clocks that are generated by the PLL in the bit layer block 409.

The bit layer block 409 divides the fixed-length data (WORD) from the word buffer block 408 into two parts and performs serial communication of those divided data parts as two serial data. The transmission side performs parallel-serial conversion and the reception side performs serial-parallel conversion. The bit layer block 409 has PLLs for transmission and reception. The transmission PLL operates (performs multiplication by 9) in response to a supplied to predetermined clock (PLCLK) and the reception PLL operates in response to an LVDS serial reception clock (LVDC_I) which is transmitted via the LVDS line from the secondary PCI serial transfer controller 35. An LVDS serial transmission clock (LVDC_O) has the same frequency as that of the clock PLCLK.

The Misc information update block 410 handles and processes a PCI bus interrupt signal (INT[A:D]#) as Misc information. The Misc information update block 410 of the secondary PCI serial transfer controller 35 generates a control word indicating the state of an interrupt signal from a device on the PCI bus 4 and inserts the control word into a serial transfer cycle of another data word. This permits a control word indicating the state of an interrupt signal to be serially transferred to the primary PCI serial transfer controller 15 via the same LVDS line as used for serial transfer of a data word. Upon reception of a control word indicating the state of an interrupt signal, the Misc information update block 410 of the primary PCI serial transfer controller 15 enables the interrupt signal on the PCI bus 2 based on the control word.

The serial interrupt synchronization block 411 processes a legacy interrupt signal from an ISA device or the like.
(Transfer of Interrupt Signal)

A description will now be given of the flow of the transfer of an interrupt signal on the assumption that a PCI device on the docking station 200 has asserted, for example, an interrupt signal INTB.

Figure 6:
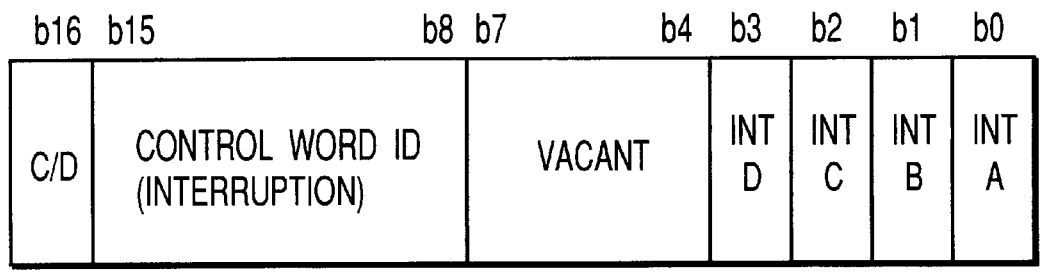
FIG. 6 is a diagram exemplifying the data format of interruption notifying control data which is used in this embodiment.

As mentioned earlier, the Misc information update block 410 of the secondary PCI serial transfer controller 35 provided in the docking station 200 monitors a change in interrupt signals INTA, INTB, INTC and INTD on the PCI bus 4. Upon detection of a change in the interrupt signal INTB, the Misc information update block 410 generates a 17-bit control word as shown in FIG. 6.

A C/D bit shows whether the present word is a control word or a data word; "1" indicating a control word is set in this C/D bit in this case. A control word ID is a specific bit pattern indicating the property of the control word that is exchanged between the controllers 15 and 35. In this example, a bit pattern indicating an interruption notifying control word that shows the state of the interrupt signal in the form shown in FIG. 6 is set. Four bits b0 to b3 respectively indicate the present levels of the interrupt signals INTA, INTB, INTC and INTD. The interruption notifying control word is characterized in that it is the shortest word in those words which are exchanged between the controllers 15 and 35 and has the highest priority in all the words. When receiving a control word from the Misc information update block 410, the block and word buffer block 406 serially transfers it at the earliest possible time via the OWB in the word buffer block 408. In this case, a 1-bit parity is added to the control word shown in FIG. 6 in the word buffer layer, and the resultant word is then subjected to parallel/serial conversion. The resultant serial data is serially transferred to the primary PCI serial transfer controller 15.

The interruption notifying control word sent to the primary PCI serial transfer controller 15 via the LVDS line is sent to the Misc information update block 410 from the IWB or IBB in the primary PCI serial transfer controller 15. When receiving the interruption notifying control word, the Misc information update block 410 enables the interrupt signal on the PCI bus 2 on the notebook PC side in accordance with the contents of the control word. As a result, the interrupt signal INTB on the notebook PC side is newly asserted.
(OWB Arbitration)

Figure 7:
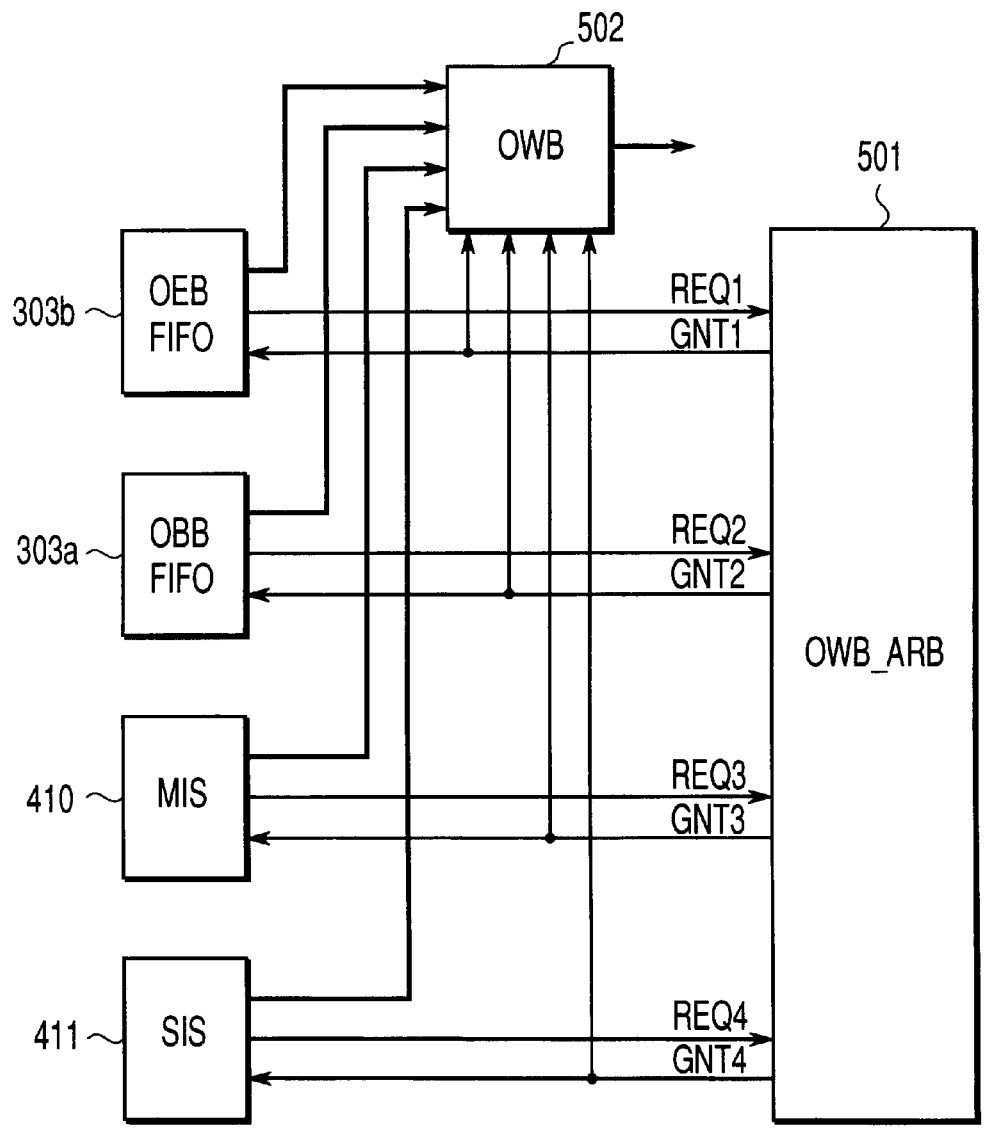
FIG. 7 is a block diagram showing the structure of an arbitration circuit provided in the secondary PCI serial transfer controller in this embodiment.

FIG. 7 shows the structure of a control logic for serially transferring the interruption notifying control word with the highest priority.

An OWB arbiter (OWB_ARB) 501 performs arbitration between words which are to be supplied to an OWB 502 for serial transfer. The OWB arbiter 501 supplies control data from the Misc information update block 410 with the highest priority over the other ISA bus control data or data word. As illustrated, a pair of transmission request signal (REQ) line and a transmission grant signal (GNT) line are laid between the OWB arbiter 501, the OEB_FIFO 303b, OEB_FIFO 303a, Misc information update block 410 and serial interrupt synchronization block (SIS) 411 in a peer-to-peer form. The priority of the transmission request signal (REQ3) from the Misc information update block 410 is set higher than those of other transmission request signals (REQ1, REQ2, REQ4), that when a plurality of transmission request signals including REQ3 are asserted at the same time, the transmission grant signal (GNT3) corresponding to the REQ3 is asserted. When the GNT3 is asserted, the Misc information update block 410 sends the interruption notifying control word to the OWB 502.

The OWB 502 selects one of the OEB_FIFO 303b, OEB_FIFO 303a, Misc information update block 410 and SIS 411 in accordance with the transmission grant signal (GNT1, GNT2, GNT3 or GNT4) and sends the transmission data from the selected unit to the bit layer. The data that is sent to the bit layer from the OWB 502 is transferred via the LVDS line to the primary PCI serial transfer controller 15 in a serial transfer cycle for fast bit serial transfer.

The provision of the means of serially transferring the interruption notifying control word with priority can allow the CPU 11 of the notebook PC body 100 to be spontaneously informed of an interruption event generated in the docking station 200 so that the interruption can be dealt with the software.

(MIS)

Figure 8:
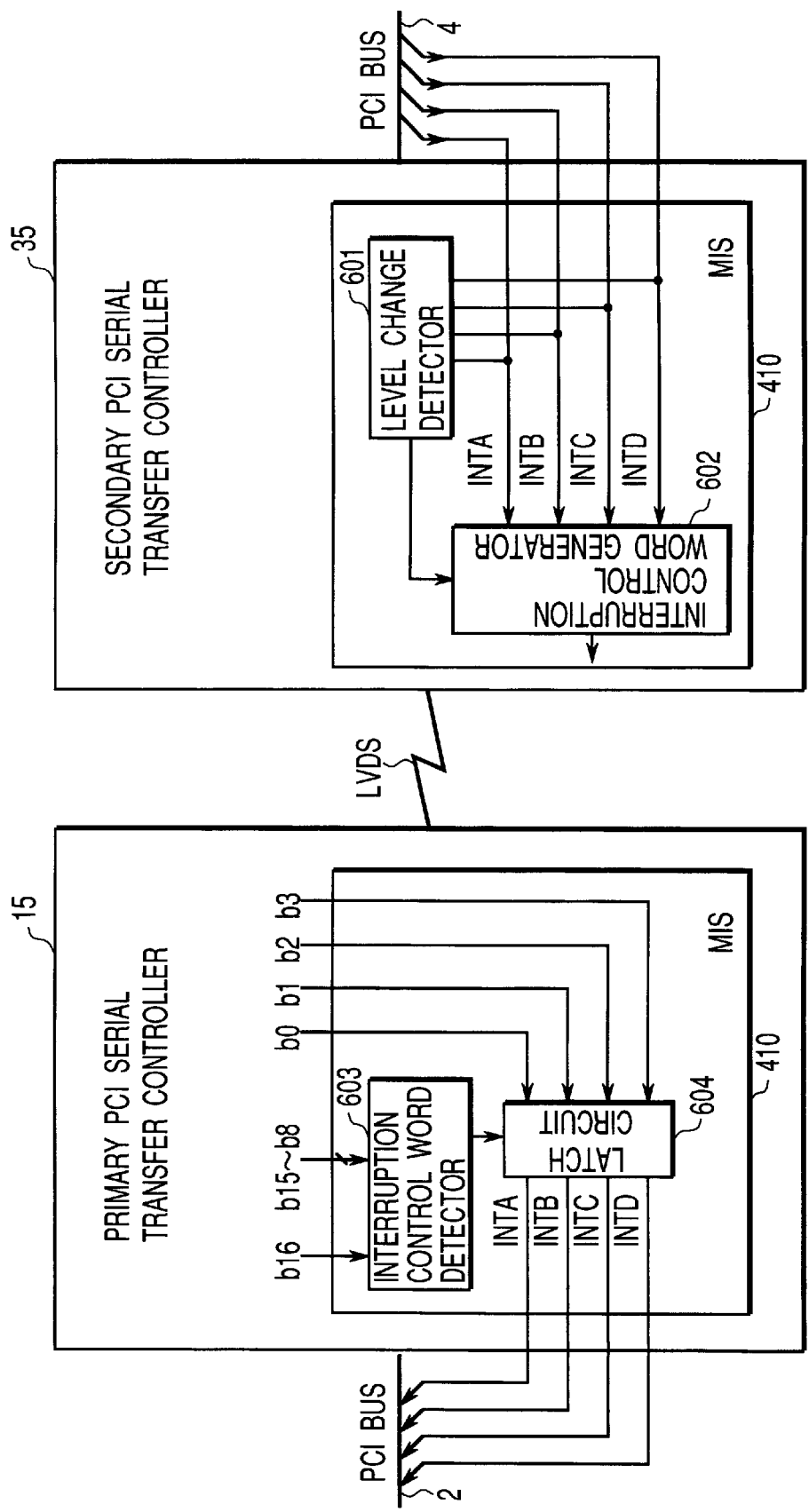
FIG. 8 is a diagram for explaining how to handle an interrupt signal in each of the primary PCI serial transfer controller and the secondary PCI serial transfer controller used in this embodiment.

Referring now to FIG. 8, a description will be given of the functional structure of the Misc information update block 410 of each of the primary PCI serial transfer controller 15 and the secondary PCI serial transfer controller 35.

As illustrated, the Misc information update block 410 of the secondary PCI serial transfer controller 35 is provided with a level change detector 601 and an interruption control word generator 602. The level change detector 601 detects if there is a change in the level of each of the PCI interrupt signals INTA-INTD of the secondary PCI serial transfer controller 35. INTA-INTD are level-triggered interrupt signals, and each PCI device holds the asserted state of each interrupt signal until that interrupt signal is received by the software. When a change in the level of any one of those interrupt signals INTA-INTD is selected (asserted or deasserted), the level change detector 601 sends an operation instruction signal to the interruption control word generator 602.

When receiving the operation instruction signal, the interruption control word generator 602 generates an interruption notifying control word having the format as shown in FIG. 6 which includes a bit pattern indicating the current states of the interrupt signals INTA-INTD on the secondary PCI bus 4 and supplies the control word to the OWB. As a result, the interruption notifying control word is inserted into a serial transfer cycle for transferring a bus cycle and serially transferred to the primary PCI serial transfer controller 15.

As illustrated, the Misc information update block 410 of the primary PCI serial transfer controller 15 is provided with an interruption control word generator 603 and a latch circuit 604. The interruption control word generator 603 detects if the word supplied to the IWB or IBB is an interruption notifying control word, and checks bits b16 and b15–b8 of the received word for that purpose. When the received word is an interruption notifying control word, the interruption notifying control word is fetched into the Misc information update block 410 from the IWB or IBB. The values of the lower four bits (b0–b3) are latched in the latch circuit 604 and output as the interrupt signals INTA-INTD on the PCI bus 2. The output statuses of the interrupt signals INTA-INTD from the latch circuit 604 are kept held until a next interruption notifying control word is received.

With this structure, transfer control of the level-triggered interrupt signals INTA-INTD can be carried out properly by mere serial transfer of an interruption notifying control word at the time when the status of the interrupt signal in the docking station 200 has changed.

Figure 9:
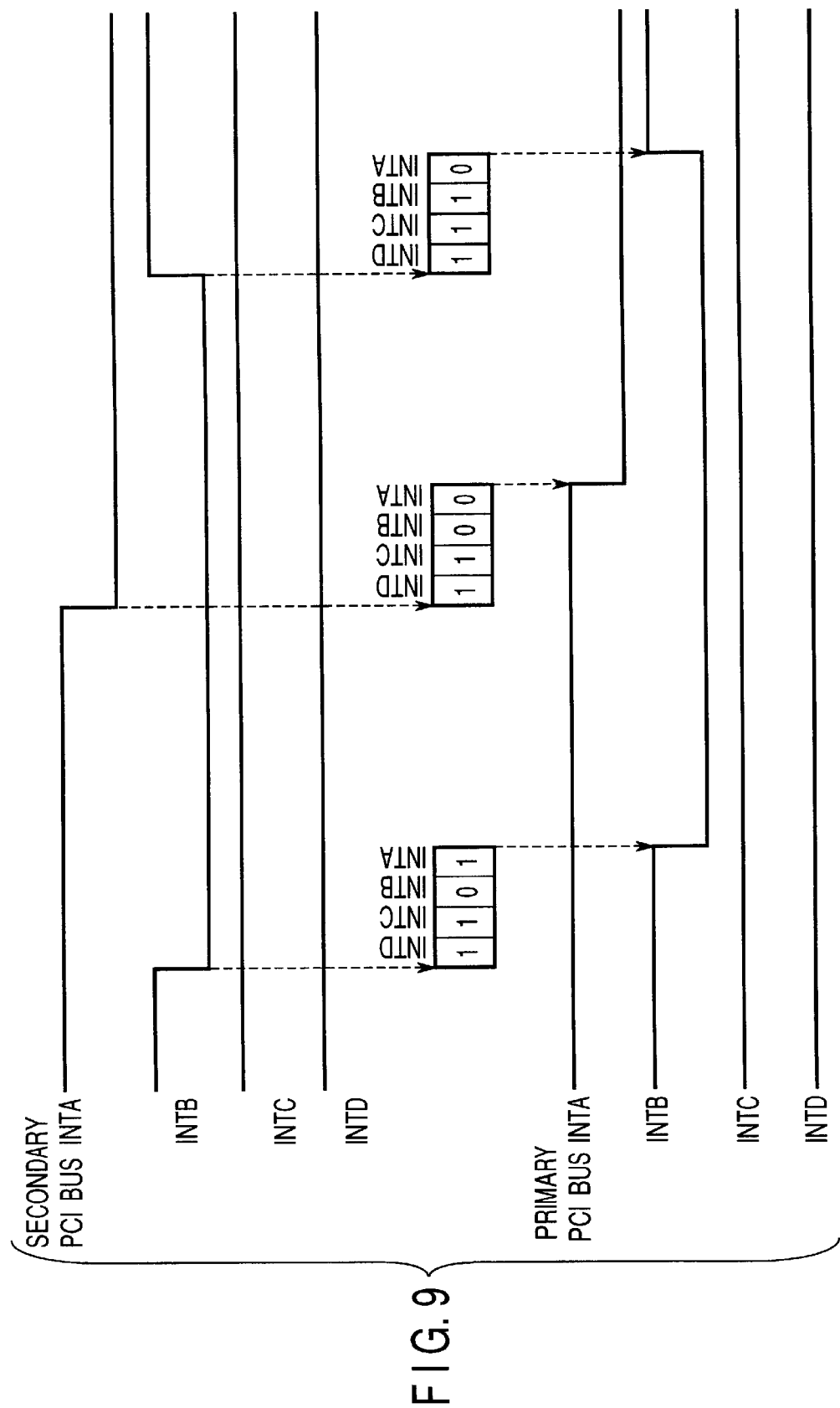
FIG. 9 is a timing chart illustrating a transfer control operation for an interrupt signal in this embodiment.

FIG. 9 shows transfer control on level-triggered interrupt signals INTA-INTD. In this example, it is assumed that on the secondary PCI bus 4 of the docking station 200, the interrupt signal INTB is asserted first, then the interrupt signal INTA is asserted after which an interruption process for the interrupt signal INTB is accepted and the interrupt signal INTA is deasserted.

When the interrupt signal INTB on the secondary PCI bus 4 is asserted, an interruption notifying control word including a bit pattern (1101) which indicates the levels of the interrupt signals INTD, INTC, INTB and INTA then is generated and is serially transferred to the primary PCI serial transfer controller 15 from the secondary PCI serial transfer controller 35. The primary PCI serial transfer controller 15 interprets the interruption notifying control word and asserts the interrupt signal INTB on the primary PCI bus 2.

When the interrupt signal INTA on the secondary PCI bus 4 is asserted next, an interruption notifying control word including a bit pattern (1100) which indicates the levels of the interrupt signals INTD, INTC, INTB and INTA then is generated again and is serially transferred to the primary PCI serial transfer controller 15 from the secondary PCI serial transfer controller 35. The primary PCI serial transfer controller 15 interprets the interruption notifying control word and asserts the interrupt signal INTA on the primary PCI bus 2.

When data indicating the reception of the interrupt signal INTB is notified to a PCI device on the secondary PCI bus 4 from the CPU 11, the interrupt signal INTB on the secondary PCI bus 4 is deasserted. As a result, an interruption notifying control word including a bit pattern (1110) which indicates the levels of the interrupt signals INTD, INTC, INTB and INTA then is generated and is serially transferred to the primary PCI serial transfer controller 15 from the secondary PCI serial transfer controller 35. The primary PCI serial transfer controller 15 interprets the interruption notifying control word and changes the state of the interrupt signal INTB on the primary PCI bus 2 to the deasserted state from the asserted state.

(Interruption Control Word Decoding)

Figure 10:
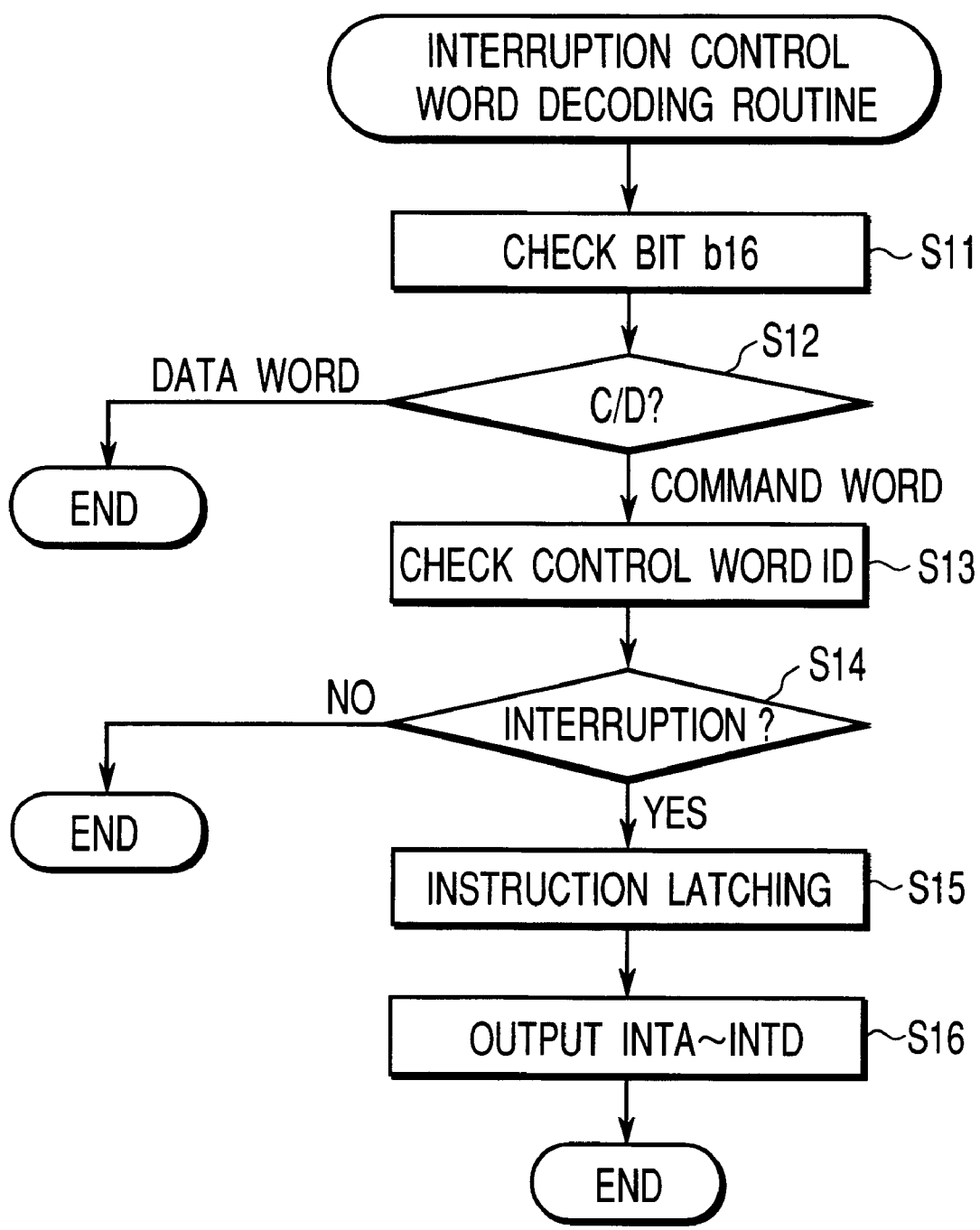
FIG. 10 is a flowchart for explaining the procedures of an interruption control word decoding routine which is executed by the primary PCI serial transfer controller in this embodiment.

The flowchart in FIG. 10 illustrates the procedures of an interruption control word decoding routine which is executed by the Misc information update block 410 of the primary PCI serial transfer controller 15.

First, bit b16 of the received word is checked to determine if the received word is a control word (steps S11 and S12). When the received word is a control word, the control word ID of bits b15–b8 is then checked to determine if the control word is an interruption notifying control word or another control word (steps S13 and S14). In the case of the interruption notifying control word, the control word is fetched into the Misc information update block 410 and a latch instruction is sent to the latch circuit 604 (step S15). Then, the latch circuit 604 latches the lower four bits (b0–b3) of the control word and the latched output signals are output as the interrupt signals INTA-INTD on the PCI bus 2 (step S16).

(Another Example of Interruption Notifying Control Word)

The foregoing description referring to FIG. 6 has been given of the example that sends the statuses of the interrupt signals INTA-INTD as a bit pattern. Instead of this scheme, the number of an interrupt signal which has changed and the direction of the change of the interrupt signal may be sent as an interruption notifying control word in the format as shown in FIG. 11. The bit number in FIG. 11 is a 2-bit code which specifies one of the four interrupt signals INTA to INTD. The direction bit indicates whether the interrupt signal specified by the bit number has been asserted ("0") or deasserted ("1"). Even with the use of such a control word, a change in an interrupt signal can be notified by serially transferring the control word.

(Selective Use of Two Controllers)

It is sufficient to transfer an interrupt signal INT generated in the docking station 200 to the PC body 100. This embodiment is provided with two controller LSIs having the same structure, the controller LSI in the PC body 100 serving as the primary PCI serial transfer controller 15 while the controller LSI in the docking station 200 serves as the secondary PCI serial transfer controller 35. It is therefore preferable that as shown in FIGS. 12A and 12B, each controller LSI should be provided with a pin for receiving an operation switching signal, so that whether the controller LSI serves as the primary PCI serial transfer controller or the secondary PCI serial transfer controller is specified by a switching signal externally supplied. By using this switching signal to also control the operation of the Misc information update block 410, the Misc information update block 410 in the controller LSI that serves as the primary PCI serial transfer controller 15 can be so controlled as to inhibit the generation of an interruption notifying control word and merely decode the control word. This can prevent a loop from being formed in the transfer path for the interrupt signals.

Alternatively, as shown in FIGS. 13A and 13B, an operation switching instruction may be written in a control register 701, provided in each controller LSI as a part of the configuration register each controller LSI, by software such as the BIOS, so that the Misc information update block 410 in the controller LSI which serves as the primary PCI serial transfer controller 15 is so controlled as to inhibit the generation of an interruption notifying control word and merely decode the control word.

Although the Misc information update block 410 is used for transferring an interruption notifying control word in this embodiment, the block 410 may also be used for transmitting other signals than an interrupt signal. For example, a so-called sideband signal can be transferred as a control word of the format that has already been explained referring to FIG. 6 or FIG. 11. In this case, a bit pattern indicating that a control word is a sideband signal should be inserted into the control word ID and information of the actual sideband signal should be inserted in b7–b0. Further, in the case of sending an interrupt signal in the format that has been explained referring to FIG. 6 or FIG. 11, there are vacant bits which may be used to simultaneously transmit information of the sideband signal and information of the interrupt signal. In this case, the control word ID that indicates that a control word includes both a sideband signal and an interrupt signal should be inserted before transmission.

As apparent from the above, this embodiment is constructed in such a way that to ensure serial transfer of both data needed to transfer a bus cycle and an interrupt signal via the same serial transfer line. Therefore, providing each of a host system and an expansion unit with two controllers which constitute a bus bridge can allow the host system to be connected to the expansion unit by a cable with fewer signal lines. As control data indicating the state of an interrupt signal is serially transferred only when the state of this interrupt signal has been changed, the throughput of serial transfer for transferring a bus cycle will not be affected.

The structure that accomplish transfer control in this embodiment should merely have controllers, which constitute a bridge, separately provided in a host system and an expansion unit which expands the functions, and the host system is not limited to the PC body 100 itself. For example, the PC body 100 may be connected to a first expansion unit through which a second expansion unit is connected to the computer body. In this case, as seen from the second expansion unit, the computer body and the first expansion unit serve as a host system. In this case, the primary PCI serial transfer controller 15 and the secondary PCI serial transfer controller 35 have only to be provided separately and respectively in the first expansion unit and the second expansion unit and the interconnection between the computer body and the first expansion unit may be achieved by parallel connection using the ordinary PCI-PCI bridge.

Although the foregoing description has been given of the case where a serial transfer line is realized by a cable in this embodiment, the serial transfer line may also be achieved by various other modes, such as the use of connectors, the wiring pattern on the circuit board, radio waves, infrared rays, ultrasonic waves and interconnecting lines in the LSI.

Even in the case where data is transferred in parallel between the controllers, transferring the state of an interrupt signal via the data transfer line can eliminate the need for a special transfer line for the interrupt signal. This can contribute to reducing the number of signal lines. In other words, the fundamental concept of this invention is the transfer of the state of an interrupt signal itself as one of bus transactions in order to reduce the number of signal lines. While it is most effective to adapt this structure to the bus bridge that is constituted by two controllers connected together by a serial transfer line, this invention may also be adapted to transfer of an interrupt signal from a first interruption controller connected to one of two buses to a second interruption controller connected to the other bus. In this case, the first interruption controller should generate control data indicating the state of an interrupt signal from a device on one of the PCI buses and transmit the control data as a bus transaction (e.g., a write transaction for writing write data) to the second interruption controller on the other bus, and the second interruption controller should then decode the control data. This can allow an interrupt signal to be transferred by using a bus transaction itself for exchanging data between the buses, thus making it unnecessary to transfer an exclusive interrupt signal between the buses.

In short, this embodiment can transfer data needed to transfer a bus cycle between buses and an interrupt signal in the same transfer line, thus permitting a host system to be connected to an expansion unit by a cable having fewer signal lines. Particularly, the number of signal lines of the serial transfer line can be reduced without affecting the system performance by using the scheme of serially transferring control data indicating the state of an interrupt signal only when that interrupt signal has been generated.

The present invention has been described on the basis of the respective embodiments. However, the present invention is not limited to the above embodiments. For example, as indicated by the following, the respective embodiments can be variously modified without departing from the spirit and scope of the invention.

The first and second embodiments describe the PCI-PCI bridge unit which is used to connect the PCI bus in PC body to the PCI bus in the docking station. However, according to the present invention, the PCI-PCI bridge unit can be used to data transferring between two buses in the same device. In this case, one of two buses which is closer to the CPU is defined as the Primary PCI bus and the other bus is defined as the secondly bus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:
   a first bus for transferring a first interrupt signal;
   a second bus for transferring a second interrupt signal;
   a first controller connected to said first bus;
   a second controller, connected to said second bus, executing a transfer cycle including a bus cycle with said first controller;
   a means, connected to said first controller, for generating control data indicating a state of the first interrupt signal on said first bus; and means, connected to said second controller, for outputting a second interrupt signal on said second bus based on said control data.

2. The computer system according to claim 1, wherein the transfer cycle is a serial transfer cycle.

3. The computer system according to claim 2, wherein said means for generating the control data detects a change in the first interrupt signal on said first bus, and generates control data indicating the state of the first interrupt signal and inserts said control data into said serial transfer cycle when detecting the change in the first interrupt signal.

4. The computer system according to claim 3, wherein said first bus transfers a first plurality of interrupt signals;
said second bus transfers a second plurality of interrupt signals;
said means for generating the control data generates control data including a bit pattern corresponding to the first plurality of interrupt signals on said first bus when any one of the first plurality of interrupt signals on said first bus has changed; and
said means for outputting the second interrupt data outputs the second plurality of interrupt signals on said second bus based on said control data in such a way that the first plurality of interrupt signals are reflected on said second bus.

5. The computer system according to claim 3, wherein said first bus transfers a first plurality of interrupt signals to which different numbers are respectively assigned;
said second bus transfers a second plurality of interrupt signals to which different numbers are respectively assigned;
said means for generating the control data generates control data indicating the number of said changed interrupt signal and a direction of a change in said interrupt signal when any one of said plurality of interrupt signals on said first bus has changed, and
said means for outputting the second interrupt data outputs the second plurality of interrupt signals on said second bus based on said control data in such a way that the first plurality of interrupt signals are reflected on said second bus.

6. The computer system according to claim 3, wherein said means for generating the control data has a latch circuit for holding a state of the second interrupt signal until receiving new control data indicating a state of a next first interrupt signal.

7. The computer system according to claim 3, further comprising:
means for arbitrating all data transferred in said serial transfer cycle in such a way that said control data is serially transferred with a highest priority over other data when there are plural kinds of data to be serially transferred in said serial transfer cycle.

8. The computer system according to claim 1, wherein said second bus is closer to a CPU than said first bus.

9. A computer system comprising:
a host system;
an expansion unit, electrically connected to said host system, for expanding functions of said host system; and
a bus bridge unit which has a first controller connected to said host system and a second controller connected to said expansion unit, and performs serial transfer of data needed to transfer a bus cycle between said host system and said expansion unit via a serial transfer line between said first and second controllers,
wherein said second controller has means for generating control data indicating a state of a first interrupt signal on an expansion unit side and performing serial transfer of said control data to said first controller via said serial transfer line, and
said first controller has means for outputting the second interrupt signal on a host system side based on said control data in such a way that the first interrupt signal is reflected on said host system.

10. A computer system comprising:
means for performing serial transfer of data needed to transfer a bus cycle between first and second buses via a serial transfer line for connecting said first and second buses;
means for detecting a change in a first interrupt signal on said one of said first and second buses, and, when detecting the change in the first interrupt signal, serially transferring control data indicating a state of the interrupt signal from one of said first and second buses to the other bus via said serial transfer line; and
means for outputting a second interrupt signal on said other bus based on said control data transferred to said other bus from said one of said first and second buses and holding a state of the second interrupt signal output on said other bus until new control data indicating a state of a next interrupt signal arrives.

11. A computer system comprising:
first and second buses;
means for detecting an interrupt signal on said first bus; and
means, electrically connected to said first and second buses, for generating control data indicating the interrupt signal and transferring said control data to said second bus from said first bus by a bus transaction for transferring data to said second bus from said first bus.

12. A data transfer method comprising the steps of:
detecting a first interrupt signal on a first bus;
generating control data indicating a state of the first interrupt signal in response to the detection of the first interrupt signal;
transferring the control data to a second bus by interrupting the control data into serial transfer cycle which includes a bus cycle between said first bus and said second bus; and
outputting a second interrupt signal on said second bus based on the control data in such a way that the first interrupt signal is reflected on said second bus.

13. The data transfer method according to claim 12, wherein said first bus transfers a first plurality of interrupt signals;
said second bus transfers a second plurality of interrupt signals; and
the step of generating control data includes the steps of:
detecting a change in the first interrupt signal on said first bus; and
generating the control data including a bit pattern corresponding to the first plurality of interrupt signals on said first bus when the change in the first interrupt signal on said first bus has been detected.

14. The data transfer method according to claim 12, wherein said first bus transfers a first plurality of interrupt signals to which different numbers are respectively assigned;

said second bus transfers a second plurality of interrupt signals to which different numbers are respectively assigned; and the step of generating control data includes the steps of:

detecting a change in the first interrupt signal on said first bus; and generating the control data indicating the number of said changed interrupt signal and a direction of a change in said interrupt signal when the change in the first interrupt signal on said first bus has been detected.

15. The data transfer method according to claim 12, wherein said outputting step includes the steps of;

holding a state of the second interrupt signal by a latch circuit until receiving new control data indicating a state of a next first interrupt signal; and outputting the second interrupt signal on receiving the new control data.

16. The data transfer method according to claim 12, further comprising the step of:

arbitrating all data transferred via said serial transfer cycle in such a way that the control data is serially transferred with a highest priority over other data when there are plural kinds of data to be serially transferred in said serial transfer cycle.

* * * * *

UNITED STATES PATENT AND TRADEMARK OFFICE
CERTIFICATE OF CORRECTION

PATENT NO. : 6,622,191 B1 Page 1 of 1
DATED : September 16, 2003
INVENTOR(S) : Nakamura It is certified that error appears in the above-identified patent and that said Letters Patent is hereby corrected as shown below:

<u>Column 18,</u>
Line 65, change "a means" to -- means --.

Signed and Sealed this

First Day of June, 2004

JON W. DUDAS
*Acting Director of the United States Patent and Trademark Office*